Feb. 21, 1928.
F. H. ELSWORTH
HATCHERY FOR MARINE LIFE
Filed May 26, 1926
1,660,259
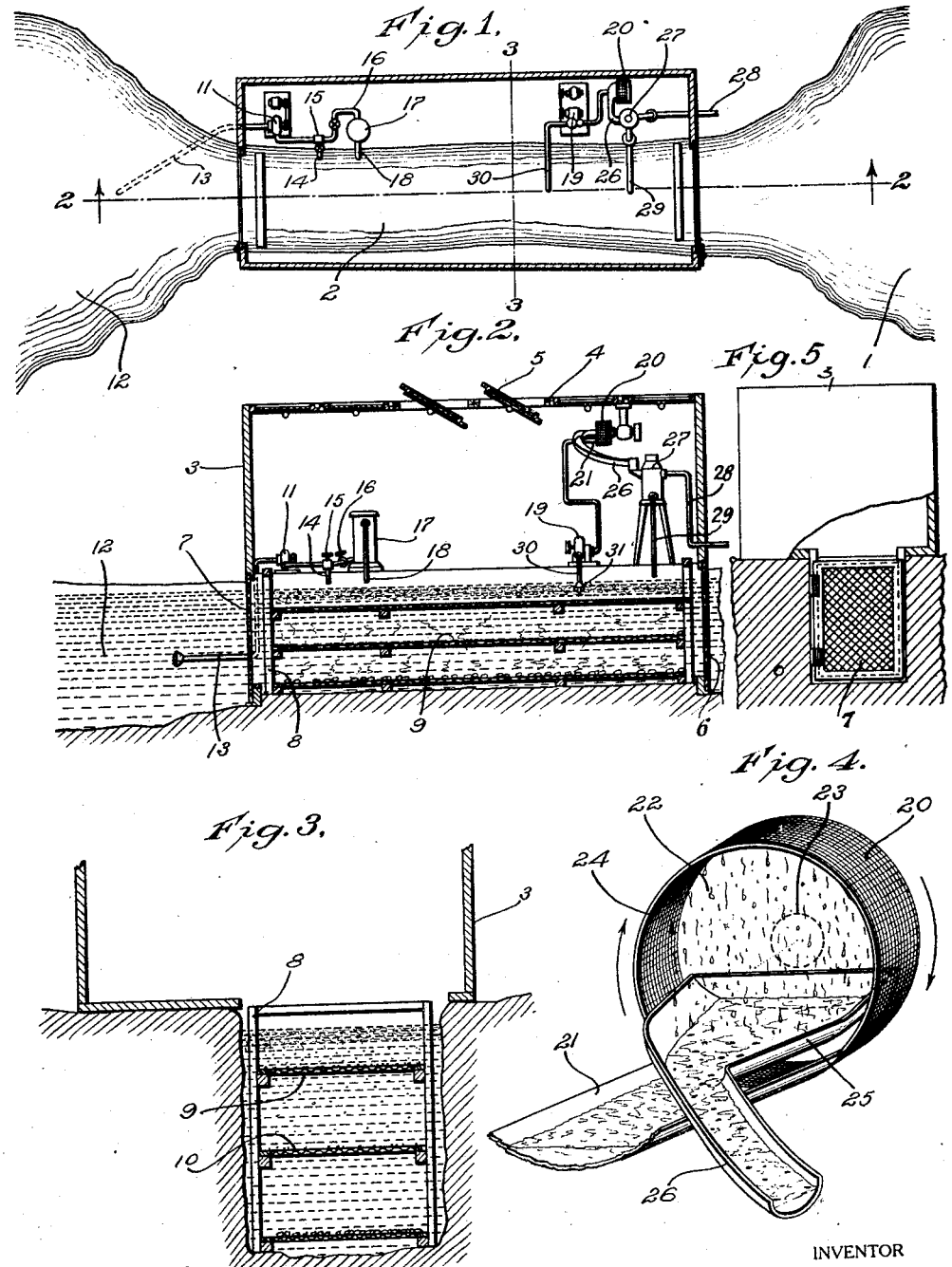
INVENTOR
FRANK H. ELSWORTH
BY
ATTORNEYS
WITNESSES Patented Feb. 21, 1928.

1,660,259

UNITED STATES PATENT OFFICE.

FRANK H. ELSWORTH, OF MONTCLAIR, NEW JERSEY.

HATCHERY FOR MARINE LIFE.

Application filed May 26, 1926. Serial No. 111,808.

This invention relates to hatcheries and particularly to an improved hatchery for marine life and has for an object to provide a construction wherein oysters and other shell fish life may be hatched and taken care of for a limited time.

Another object of the invention is to provide a hatchery for oysters wherein means are presented for maintaining in a limited area a substantially ideal condition for the spawn of the marine life and for the young life after hatching.

A further object is to provide a construction wherein a substantially ideal hatching condition may be maintained and also wherein the various enemies of the oysters or other life are eliminated during the hatching process and for a short time thereafter.

In the accompanying drawing—

Figure 1 is a plan view of a hatchery, disclosing an embodiment of the invention, the upper part of the housing being broken away.

Figure 2 is a sectional view through Figure 1, approximately on line 2—2.

Figure 3 is a transverse sectional view through Figure 1 on line 3—3.

Figure 4 is an enlarged detail fragmentary perspective view showing a water separator and enemy eliminator.

Figure 5 is an end view of the hatchery.

In the propagation of marine life and particularly in the propagation of oysters, it has been found that certain comparatively sheltered bodies of water present more or less ideal conditions for the spawning, hatching and growth of oysters than the more exposed bodies of water. Oysters have a certain spawning season which lasts usually less than half a month and, consequently, all of the spawn and young oysters must be produced in this comparatively short period of time. However, at different parts of the earth the spawning season is at different times of the year, as for instance, in Florida it is comparatively early, whereas in New York and Connecticut it is later, usually some time in August.

In the present invention means have been provided for providing a substantially ideal condition for taking care of spawning oysters and, consequently, if the device is located near New York for instance, spawning oysters from near by may be used at the spawning time of said oysters and at other times of the year, spawning oysters may be shipped in from the south or other parts of the earth so as to arrive shortly before they will spawn. The spawning oysters are adapted to be placed in the hatchery sometime previous to the spawning period so that when they spawn, the eggs may be properly taken care of and the young life protected for a limited time. By thus providing a substantially ideal condition for any time of the year, young oysters may be produced for several months in the year instead of one or two weeks.

Referring to the accompanying drawing by numerals, 1 indicates a body of salt water which has a section 2 suitable for conversion into part of the hatchery. If desired, instead of having a comparatively small neck of water a small stream or bed could be used without departing from the spirit of the invention and also if desired, an artificial basin or container could be used if desired. Preferably a body of salt water is selected where the tide flows gently back and forth without much washing action. For the purpose of illustrating the invention, the section 2 of water has been illustrated and above and around the same has been provided a housing 3 which may have solid walls or walls with glass panels but preferably a roof 4 is provided with glass sections 5 capable of being tilted so as to be opened and allow air to pass. Associated with the housing 3 and preferably forming part thereof, are gates 6 and 7 which may be fixed firmly in place but are preferably hingedly mounted and held in place by suitable catches so as to be readily swung to an open position whenever desired. Each of these gates is preferably formed with a frame of wood or other material which rests on some form of packing, as for instance, rubber, whereby nothing can pass through the gates except through the space enclosed by the frame. This space is provided with wire mesh, preferably comparatively fine mesh so that the water and marine food may pass but ordinary marine life, as for instance, snails and small fish, cannot pass. Arranged in the section or neck 2 of water is a frame 8 of wood or other material and on this frame is mounted a series of wire mesh shelves 9. The lowermost shelf 9 is adapted to receive the oysters which are about to spawn and then the frame, oysters and associated parts are lowered to the position shown in Figures 2 and 3. On the different shelves are preferably arranged shells, sea weed or other comparatively hard substances whereby after the oysters have spawned and the hatched oysters sink toward the bottom, they may strike some of these substances and adhere thereto. It will be noted that the wire mesh in the shelves 9 is sufficiently open to permit the passage of certain of the hatched oysters while certain of the hatched oysters engage and adhere to some of the shells or other substances carried by the shelves. By providing the frame 8 and making the same readily removable, it is comparatively easy to arrange the oysters which are about to spawn and also comparatively easy to remove the small oysters after they have adhered to objects provided on the various shelves. As the oysters spawn, the eggs will rise to the surface of the water or near the surface and by reason of the heat and action of the water, these eggs will in the course of time, hatch and produce the small live oyster which will after a short time, sink toward the bottom and will keep on sinking until it strikes some object to which it can adhere.

In all waters there are certain enemies to the oysters and even in the confined water of neck 2, certain enemies may be found which hatch in the water the same as the oysters. One of the prominent enemies which attacks small oysters is the snail as well as other marine or semi-marine life. Means have been provided to eliminate these enemies so that practically all of the eggs may hatch and may develop into oysters. In order to maintain the temperature of the water in the neck 2 in condition for ideal hatching and developing of small oysters, a pump 11 has been provided which is connected to the body of water 12 by a suitable pipe 13. This body of water is always slightly colder than that contained in the neck 2 so that if it is desired to cool the water in neck 2, a desired quantity is pumped into the neck 2 through the outlet 14 which is controlled by a suitable valve 15. In case it should be desired to raise the temperature in the neck 2, valve 15 is closed and valve 16 opened. This will cause the water from pump 11 to pass through the heater 17, which heater may be any desired kind of heater and from this heater the water is discharged through pipe 18 into neck 2. As the water is only heated slightly, any food that may be in the water will naturally be deposited in the neck 2 and also food from adjacent waters 1 and 12 will pass through the gates 6 and 7. In addition, at the proper time, marine food may be added to the water in neck 2 by hand.

In order to eliminate the enemies of the spawns and young oysters, a pump 19 is provided, said pump being of any desired kind, as for instance, an ordinary Gould pump now on the market. The pump 19 draws up some of the water from the neck 2 and also the spawn and any enemies adjacent the spawn. This combination of water, spawn and enemies is discharged into a rotating drum 20 through a suitable trough 21. Drum 20 is provided with a rear wall 22 connected to the shaft 23, which shaft is rotated by an electric motor or by any desired power means. The wall 22 is connected to the foraminous tubular section 24 and drum 20, said tubular section being preferably of rather fine wire mesh though a perforated sheet metal might be used. Extending into the drum 20 is a receiving or drip pan 25 merging into a trough 26, which trough discharges into a separator 27 which is preferably an ordinary cream separator of the centrifugal type now well known on the market. As the water, spawn and enemies are discharged into the drum 20, the water will quickly pass through the drum while the spawn and enemies will be carried upwardly and pass the pan 25 so that when gravity acts sufficiently on these forms of life they will drop into the pan 25 and move down the trough 26 to the separator 27. It is, of course, evident that a certain small quantity of water will also be carried by the drum 20 and discharged into the pan 25 so that a sufficient liquid condition is maintained to permit the spawn and enemies to readily flow into the separator 27 where the enemies are separated and discharged through pipe 28 into the body of water 1 while the spawn is discharged through pipe 29 back into the neck 2. If desired, the pipe 30 connecting the nozzle 31 to pump 19 may be flexible and of an appreciable length so that it can be moved over the surface of the water in neck 2 or left at any desired point so that all of the spawn and enemies may be gathered up and eventually pass through the separator 27. This action may be performed once or a number of times but preferably several times as the enemies hatch and develop in the favorable condition in the neck 2 as well as the spawn and if they were not removed from time to time they would kill or injure the spawn or hatched oysters. After one batch of spawns have been properly taken care of and hatched, a second batch of spawning oysters may be used and the operation repeated and if desired, other batches may be used from time to time so as to provide a more or less continuous supply of young oysters for oyster beds to be planted at desired points.

What I claim is:

1. A hatchery for oysters comprising means for enclosing a body of water, said means including a housing for protecting the water against change of temperature of the air and a pair of gates formed of wire screens, said gates being submerged and presenting restricted passage-ways for permitting water to flow, said water being adapted to receive spawning oysters, a pump for removing some of the water, spawn and enemies of the spawn, means for separating the water from the spawn and the spawn's enemies, and means for separating the spawn and its enemies, said means including discharge pipes, one pipe discharging the enemies to a distant point and the other discharge pipe discharging the spawns back into the water from which they were taken.

2. A hatchery for oysters including means for enclosing a body of water, a housing arranged above the body of water, a wire mesh gate connected with the housing and positioned in the water and extending from one bank to the other so as to enclose said body of water completely, said wire mesh acting to permit water and oyster food therein to freely pass back and forth while preventing enemies from passing into said body of water, and means for removing the enemies of the spawn from said body of water without injuring the spawn.

3. A hatchery for oysters comprising means for enclosing a body of water, said means including spaced gates of wire mesh, said wire mesh acting to permit water to freely enter and leave while preventing enemies of the oysters from entering, and means including a separator for removing from said body of water marine life which are enemies of the oysters.

4. A hatchery for oysters comprising a housing adapted to be placed over a body of water and extend from one bank to the other, a gate at each end of the housing, said gates depending into said water so as to separate the water beneath the housing from the water at each end of the housing, said gates being formed principally of wire mesh screening whereby the water may freely flow back and forth through the gates while preventing objects of any appreciable size from passing into or from said body of water, a pump for pumping some of said body of water, the oyster spawn therein and enemies adjacent the spawn, a separating drum for receiving said water, spawn and enemies, said drum being provided with a pan and trough for guiding the spawn and enemies to a given point and the water back into the said body of water, a separator for separating said enemies and spawn, a pipe for directing the separated spawns back into said body of water, and means for directing the enemies to a given point.

5. A hatchery for oysters comprising means for enclosing a body of water, said water being adapted to contain oyster spawn and the enemies of the oyster spawn, a pump for removing some of said water, spawn and enemies of the spawn, a rotatable foraminous drum positioned to receive in the lower part thereof of the water, spawn and spawn's enemies from said pump, the rotation of said drum causing the spawn and spawn's enemies, together with a small quantity of water, to move upwardly and then drop downwardly through the air, a receiving pan positioned in said drum above the lower portion thereof for receiving the spawn, the spawn's enemies and the small quantity of water raised, said pan catching the spawn, the spawn's enemies and the small quantity of water as they pass through the air under the action of gravity, a centrifugal separator, a conduit for guiding said spawn and spawn's enemies together with said small quantity of water to said separator, a conduit extending from said separator for guiding the spawn's enemies to a distant point, and a conduit for guiding the spawn and said small quantity of water back into said body of water.

FRANK H. ELSWORTH.